(12) United States Patent
Kubo et al.

(10) Patent No.: US 7,602,945 B2
(45) Date of Patent: Oct. 13, 2009

(54) DRIVING SUPPORT APPARATUS

(75) Inventors: Yuichi Kubo, Odawara (JP); Hiroshi Chiba, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 691 days.

(21) Appl. No.: 11/474,394

(22) Filed: Jun. 26, 2006

(65) Prior Publication Data

US 2007/0053551 A1 Mar. 8, 2007

(30) Foreign Application Priority Data

Sep. 7, 2005 (JP) .............................. 2005-258667

(51) Int. Cl.
- *G06K 9/00* (2006.01)
- *H04N 7/00* (2006.01)
- *G08G 1/16* (2006.01)
- *G08G 1/123* (2006.01)

(52) U.S. Cl. ........................ 382/104; 348/148; 340/903; 340/988

(58) Field of Classification Search .................. 382/103, 382/104, 106; 340/435, 436, 576, 903, 933, 340/988; 348/47, 118, 119, 148, 837; 180/169, 180/192, 193

See application file for complete search history.

(56) References Cited

U.S. PATENT DOCUMENTS 6,056,374 A * 5/2000 Hiwatashi .................. 303/193
7,190,282 B2 * 3/2007 Maemura et al. ........... 340/903

FOREIGN PATENT DOCUMENTS

| JP | 10-024801 A | 1/1998 |
|---|---|---|
| JP | 11-321494 A | 11/1999 |
| JP | 2001-101592 A | 4/2001 |
| JP | 2002-049998 A | 2/2002 |
| JP | 2004-056763 A | 2/2004 |

OTHER PUBLICATIONS

English Translation of Chinese Office Action issued in Chinese Patent Application No. CN 200610107867.2, dated Feb. 20, 2009.
Liu, Ya et al., "A Visual Surveillance System Based on Principal Motion Analysis for Open Country- Motion Target Detection, Tracking and Panorama Generation," Robot, vol. 23.3, p. 250-255, May 31, 2001.

* cited by examiner

*Primary Examiner*—Abolfazl Tabatabai
(74) *Attorney, Agent, or Firm*—McDermott Will & Emery LLP (57) ABSTRACT

Disclosed is an apparatus which, even when it becomes impossible to take an image of a mobile object due to existence of an obstacle to hide the mobile object, is capable of making a simulatory screen display of the mobile object, thereby notifying a driver of a risk of collision with the mobile object. Even when it is impossible to take an image of the mobile object because of existence of an obstacle, the apparatus displays a simulated picture image of the mobile object superimposed on an actual picture image, by obtaining an optical flow or by performing pattern matching. Thus, an effect is obtained that the mobile object is viewed as if transmitted through the obstacle. By notifying the driver of the risk of collision in advance by means of sound or video image perceptible by a human being, the danger of the collision is avoided.

2 Claims, 10 Drawing Sheets

FIG.1
Structural Block Diagram:
Vehicle Mounting Multi-camera Driving Support Apparatus FIG.4
Block Diagram of Driving Support Apparatus

FIG.5
Simulatory Screen Display of Modile Object

FIG.7

Simulatory Screen Display of Character and Moving Direction

Screen Display at Time t0

Screen Display at Time t1

Screen Display at Time t2

Time t

FIG.8

Simulatory Screen Display of Obstacle

Screen Display at Time t0

Screen Display at Time t1

Screen Display at Time t2

Time t

FIG.9
Simulatory Screen Display with Icon

FIG.10

Simulatory Screen Display of Space

States Seen from Above at Time t0, t1, t2

Screen Display of Space at Time t0, t1

Screen Display at Time t2

Time t

DRIVING SUPPORT APPARATUS

BACKGROUND

The present invention relates to a driving support apparatus.

As a background art in the technical field of the present invention, there is for example one that is disclosed in Japanese Unexamined Patent Publication No. H10-24801.

According to the publication, a device is made with the object of assuring a safety entry of a vehicle from a narrow road into a crossroad.

To attain the object, the device comprises photographing means 1A and 1B installed at the front of the vehicle, distance measuring means 2A and 2B installed at the sides, toward the front, of the vehicle for measuring the face-to-face distance to the sides, a transmission means 3 for sending image signals and distance signals obtained by the photographing means and the distance measuring means through a radio circuit, a receiving means 4 for receiving the signals sent from the transmission means 3, a vehicle speed detecting means 7 for detecting the speed of the vehicle, and a control means 6 for allowing an image derived from the image signals obtained from the photographing means 1A and 1B to be displayed on predetermined parts 11A, 11B of the windshield 10 of the vehicle, when the vehicle speed is lower than a preset speed and the distance represented by the distance signals received by the receiving means 4 is lower than a preset distance.

As another background art in the technical field of the present invention, there is for example one that is disclosed in Japanese Unexamined Patent Publication No. 2002-49998.

According to the publication, there are increasing car crashes due to failure of looking ahead properly of the driver, who inadvertently shifts attention to the control panel in order to operate the navigator, air conditioner, etc. Under the situation, the device disclosed in the publication has an object to provide a drive support device which can attain the safe drive of a vehicle by obtaining outside information on the surroundings of the vehicle and providing information about oncoming vehicles to the field of vision of the driver when looking at the control panel, without giving a sense of incongruity to the driver.

This drive support device is provided with an outside situation monitor 22 which performs all-directional monitoring by means of a camera 21, a dangerous object detector 23 which detects a dangerous object from the information obtained by the monitor 22, a dangerous object information display 24 which is placed along the line of view of the driver when operating the control panel, and a dangerous object decision unit 31 which determines a dangerous object from the information obtained by the detector 23, in which the image of an oncoming object is displayed on the display 24 only when a dangerous object is detected by the unit 31.

As a further background art in the technical field of the present invention, there is for example one that is disclosed in Japanese Unexamined Patent Publication No. H11-321494.

A device, according to the publication, is made with the object to allow a driver to carry out the final judgment and ensure great safety by allowing the driver to confirm the position and kind of other vehicles having a potential for collision when there are such vehicles in danger of colliding with his own vehicle.

While a vehicle 2 is traveling, a picture signal output from a camera 3 is image processed, and thereby, when another vehicle comes near from just backside, from right backside, or from left backside, the direction of approach is detected in response to the position of a turn signal switch 5, so that a buzzer sound is generated to draw attention of the driver. Further, based on the picture signal output from the camera 3, the vehicle having a potential for collision is displayed on a display device 10 marked with a square frame mark 11 in a superimposed manner to allow the driver to recognize the vehicle having the potential for collision.

SUMMARY

With respect to vehicle-mounted image taking systems having a function to process image information, including cameras and other image signal processors, there is an arrangement enabled to take images of the scenes in the rearward direction of the vehicle or in the dead angle zones of the driver and display the taken images on a monitor. An object vehicle having a potential for collision with a host vehicle can sometimes be hidden behind an obstacle blocking the driver's vision. Upon jumping out of the objective vehicle from the obstacle, the host vehicle coming to the spot might collide with the object vehicle because the driver's operation loses the timing to avoid the collision. Accordingly, there is a demand for a device enabling the user to recognize an object even if it is hidden from the vision of the user by an obstacle. The present invention has been made to meet such a demand.

There has not been made a collision preventing system enabled to detect, with use of a millimeter-wave radar, an object having been hidden behind an obstacle and emerging from a dead angle zone of the driver to the front of the host vehicle, or a system recognizing an object having a potential for collision, predicting a possibility of collision, and letting the collision potential object to be known by sound or picture image recognizable by a human being. Further, there has not been made such a system structure in which devices realizing the foregoing systems, or devices for announcing such a potential danger, are provided not only for the host vehicle but also for the object vehicle and even for a third party, or the relevant devices are installed all over the town. If such a system structure were established, general public would be notified of a potential danger in its oncoming direction by means of audio or video or the like perceptible by human sense such as auditory and visual sense. In view of the foregoing, it is essential to provide a system for letting people know of the potential danger through utilization of picture image or sound and a system for predicting a possible collision between objects by means of stereoscopic image taking system using one or more cameras.

The present invention aims to provide a driving support system ensuring greater safety.

In order to attain the above mentioned object, the present invention includes an image taking module to take an image of an object of shooting, a display module to display the image taken by the image taking module, and a controlling module, when a mobile object is within the object of shooting, to calculate an optical flow of the mobile object and, when it is unable to take an image of the mobile object because of its being hidden behind another object, to calculate the position of the mobile object based upon the optical flow of the mobile object calculated before it has been hidden, and to control the display module so as to display the mobile object superimposed on the object hiding the mobile object.

According to the present invention, a driving support system ensuring greater safety can be obtained.

BRIEF DESCRIPTION OF THE DRAWINGS

These and other features, objects, and advantages of the present invention will become more apparent from the following description when taken in conjunction with the accompanying drawings wherein.

DETAILED DESCRIPTION OF PREFERRED EMBODIMENTS

A first embodiment of the present invention will be described below with reference to the accompanying drawings.

A driving support apparatus according to the first embodiment of the present invention includes an image taking module to take images of objects in front of a host vehicle and in the surroundings of the host vehicle, a detecting module to detect the direction of travel of the host vehicle, an optical flow calculation module to calculate an optical flow from the picked-up image data, and a correcting module to correct the calculated optical flow based on the data of the traveling direction of the host vehicle.

The driving support apparatus further includes a display module which, even when an object is hidden behind an obstacle blocking the driver's view, makes, on the basis of the optical flow data calculated from the picked-up image, a simulatory screen display of the hidden portion, a recognition module which previously stores an object of interest and recognizes an object by making pattern matching of a taken image of the object with the stored image, a storage module which stores taken image information, a dead-angle information displaying module which extracts dead-angle information from the stored information in the storage module and makes a simulatory screen display of the dead-angle image, and a computation module which, even if a mobile object has been hidden behind an obstacle blocking the driver's vision, makes a prediction of the mobile object dashing out of the obstacle at any time by making use of the optical flow of the mobile object.

The apparatus will be described below in a concrete manner.

First Embodiment

Figure 1:
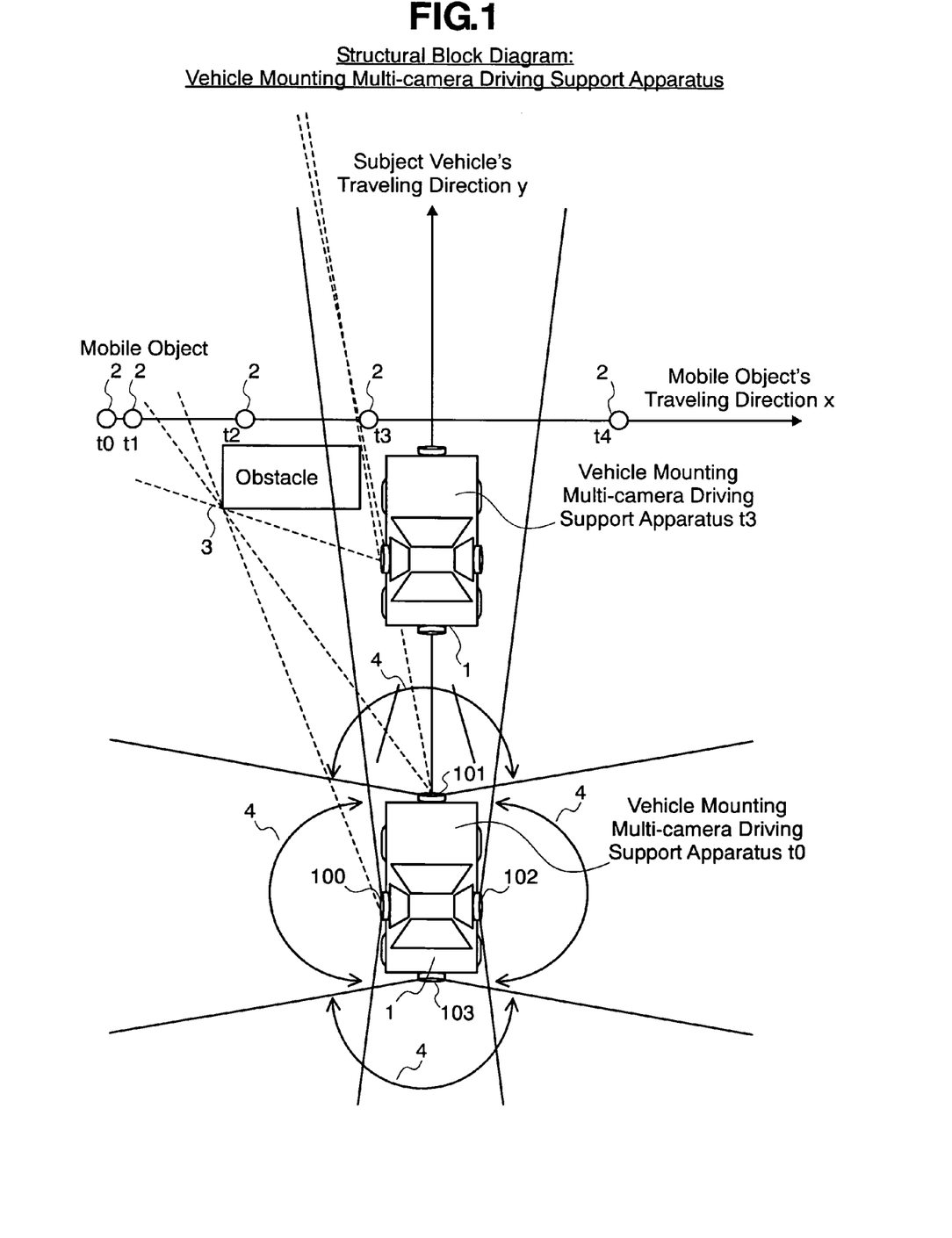
FIG. 1 is a structural block diagram of a vehicle mounting a multi-camera driving support apparatus.
Figure 2:
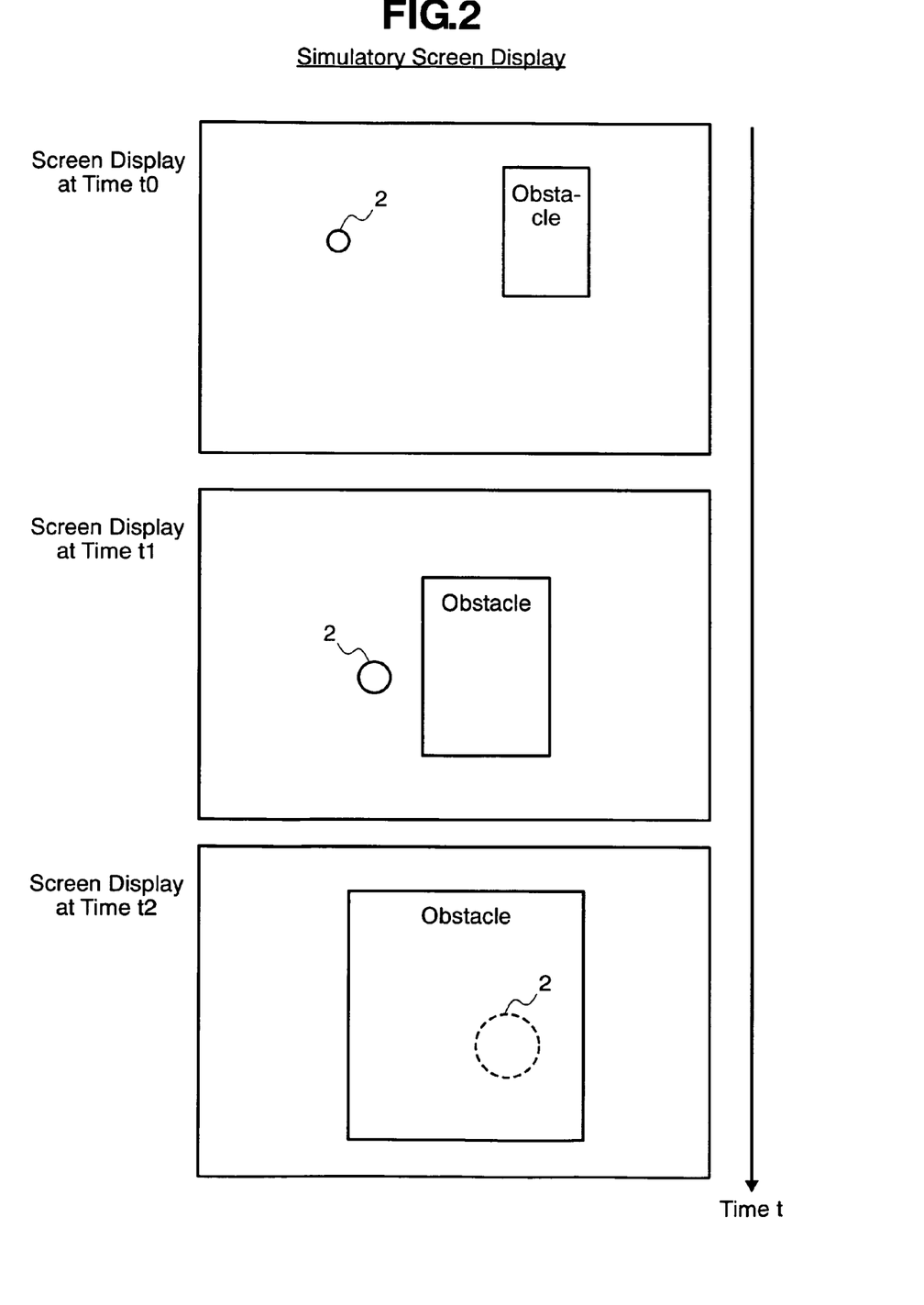
FIG. 2 shows a simulatory screen display.

In FIG. 1, there is shown an embodiment of the present invention mounting a plurality of cameras on a vehicle. A vehicle mounting a multi-camera driving support apparatus 1 (hereinafter, called "host vehicle"). mounts a plurality of cameras 10 thereon and shoots the surrounding area of the host vehicle 1 in a visual-field angle 4 of each camera. While the host vehicle 1 is moving in its traveling direction y, a mobile object 2, such as a bike, in its traveling direction x, is approaching the host vehicle 1. Positions of the mobile object 2 according as the time passes are indicated by t0-t4. Further, in the area being shot by the cameras 100, 101, there is present an obstacle 3 blocking the camera shooting of the mobile object 2. Due to the existence of the obstacle 3, there is timing that the cameras 100, 101 cannot shoot the mobile object 2 at time t2. The range in which the shooting becomes impossible due to existence of the obstacle 3 is indicated by dotted lines, with respect to the visual-field angle 4 in which the shooting by the cameras 100, 101 is possible under normal circumstances. Screen displays at time t0-t2 are shown in FIG. 2. An optical flow is detected by shooting the mobile object 2 at t0, t1. An image of the mobile object 2 predicted to be present at time t2, by making use of the optical flow, is displayed on a screen superimposed on the actual image of the obstacle 3 at time t2. If, at time t2, it is possible for the driver of the host vehicle 1 to take action to avoid a collision by controlling, for example, the brake or steering wheel, the collision can be avoided.

Second Embodiment

Figure 3:
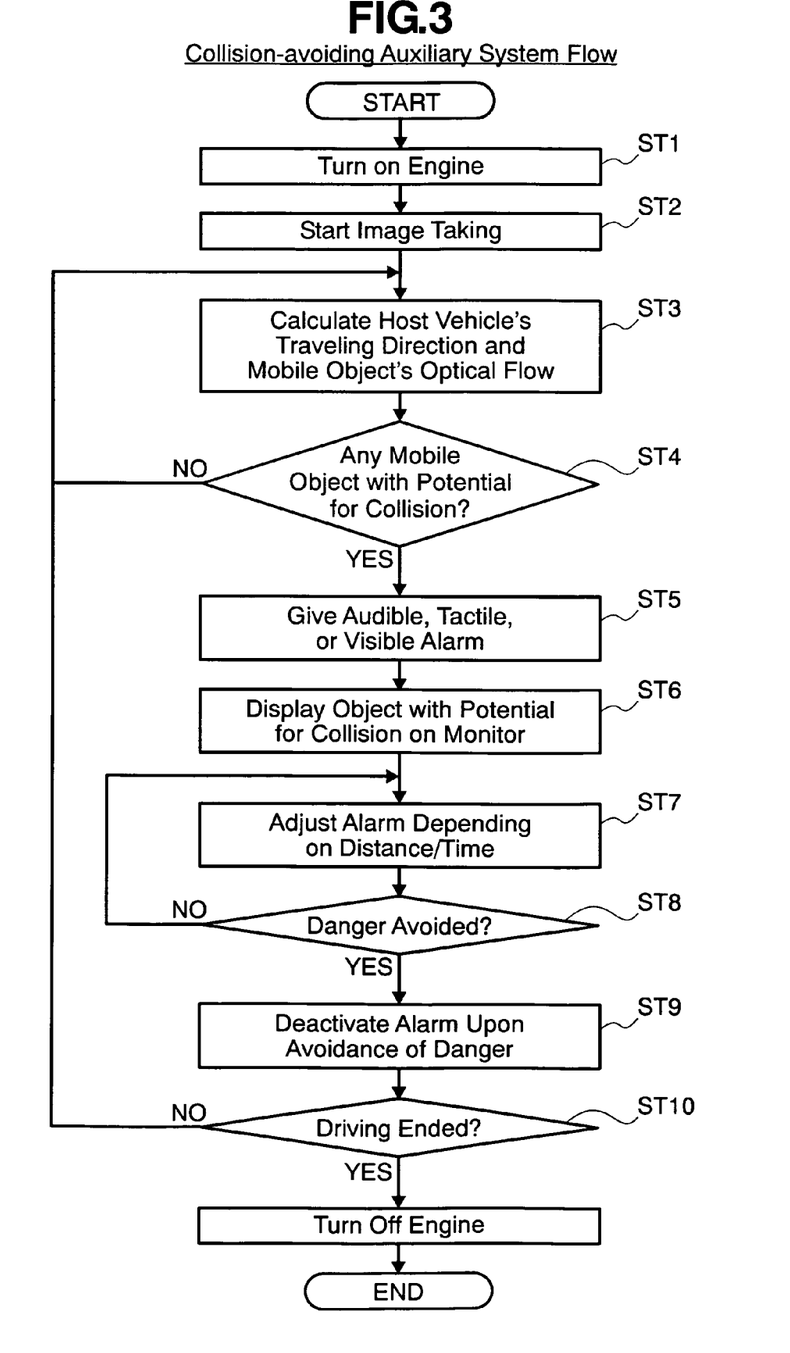
FIG. 3 is a flowchart of a collision avoiding auxiliary system flow.

A driving support flow to avoid a collision by the driving support apparatus according to the present invention is shown in FIG. 3. With the engine turned on (ST1), the vehicle 1 starts image taking (ST2). An optical flow of a mobile object in the picture information being taken and traveling direction data of the host vehicle are detected (ST3). It is determined whether there is a mobile object having a potential for collision with the host vehicle on the basis of the data detected at ST3 (ST4). If there is no such object, the process at ST3 and that at ST4 are repeated. If then an oncoming mobile object having the potential for collision is detected, the system informs the driver of oncoming of the mobile object having the potential for collision by means of audible, tactile, or visible alarm (ST5) and displays the mobile object 2 oncoming and having a potential for collision on the monitor (ST6). The system adjusts the alarm by, for example, increasing the alarm loudness depending on distance and time (ST7), determines whether the danger has been avoided (ST8), and if the danger has not been avoided, it repeats ST7 and ST8. If the danger has been avoided, it deactivates the alarm (ST9). The system determines whether the host vehicle is continuing driving (ST10), and if it is continuing driving, ST3 and ST4 are repeated again. When the driving is ended, the engine is turned off (ST11) and the driving support is stopped.

Third Embodiment

Figure 4:
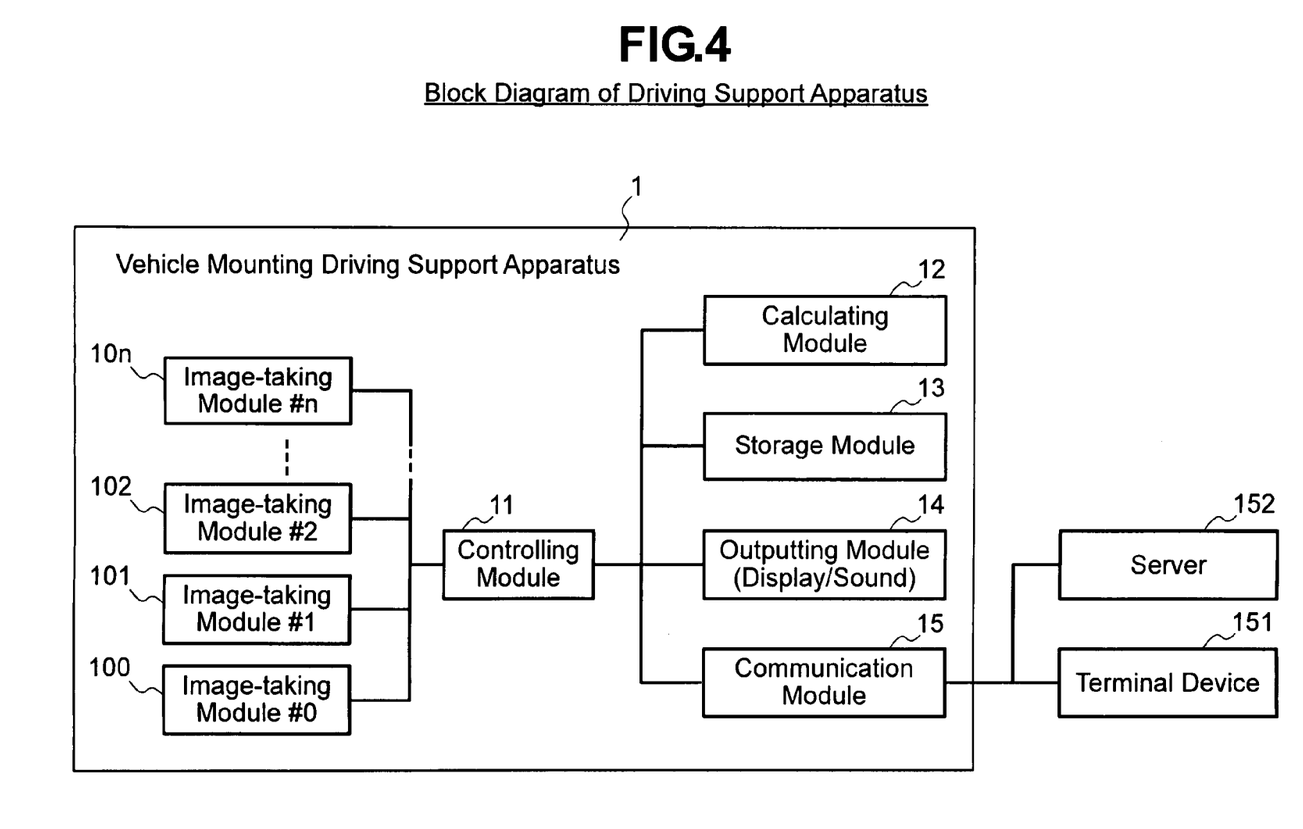
FIG. 4 is a block diagram of a driving support apparatus.

FIG. 4 shows a block diagram of the driving support apparatus of the present invention. The vehicle having a driving support apparatus mounted thereon 1 includes image taking modules 100, 101, 102, . . . , 100n to take images of the surroundings of the vehicle and has a controlling module 11 to control the taken image data. The vehicle 1 further includes a calculating module 12 to calculate an optical flow on the basis of the taken image data and a storage module 13 which stores the taken image data and the optical flow data. The storage module 13 stores not only the taken image data but also various electronic data. For example, it stores in advance such information as image data and characteristics of objects of interest for use in pattern recognition. Namely, even when an image taken by the image taking module is only a portion of a mobile object, it is made possible to make a simulated display to show what there exists by pattern recognition with use of the previously stored information. An outputting module 14 has a function to inform the driver of the traveling direction of the oncoming mobile object by audio or video.

The apparatus further includes a communication module 15 to communicate with a terminal device 151 and a server 152 located outside.

Fourth Embodiment

Figure 5:
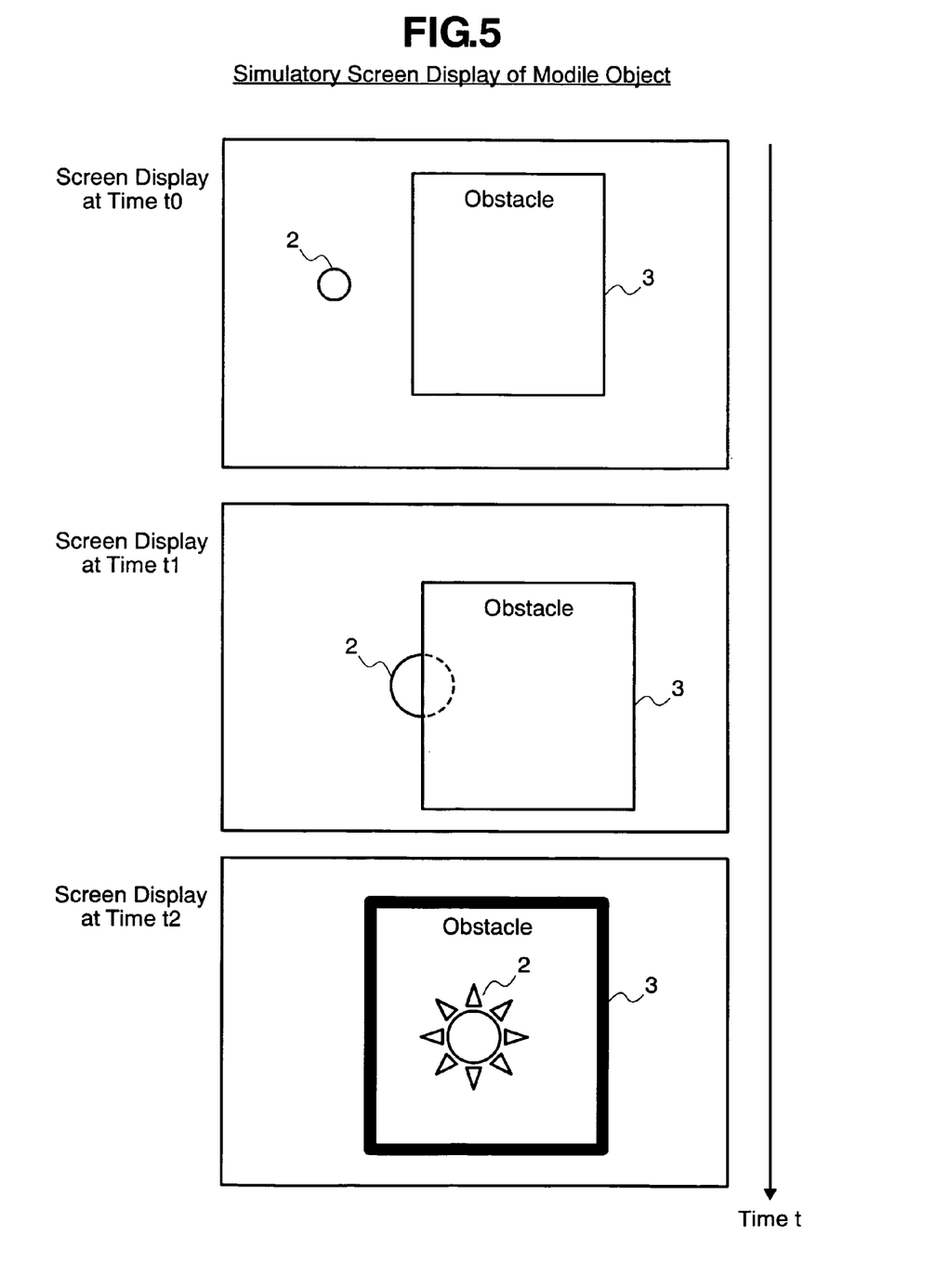
FIG. 5 shows a simulatory screen display of a mobile object.

A method of making a simulatory screen display of the mobile object 2 at time t0-t2 of the present invention is shown in FIG. 5. With the use of an optical flow of the mobile object 2, the image of the mobile object 2 is displayed even when the obstacle 3 has overlapped the mobile object 2, as indicated by the dotted line in the screen display at time t1. And, even when the mobile object 2 has been completely covered by the obstacle 3, the mobile object 2 is indicated, as shown in the screen display at time t2, with the dotted line or as a transmitted image superimposed on the obstacle 3. Thus, the mobile object 2 is indicated such that it is traveling in a successive motion.

Fifth Embodiment

Figure 6:
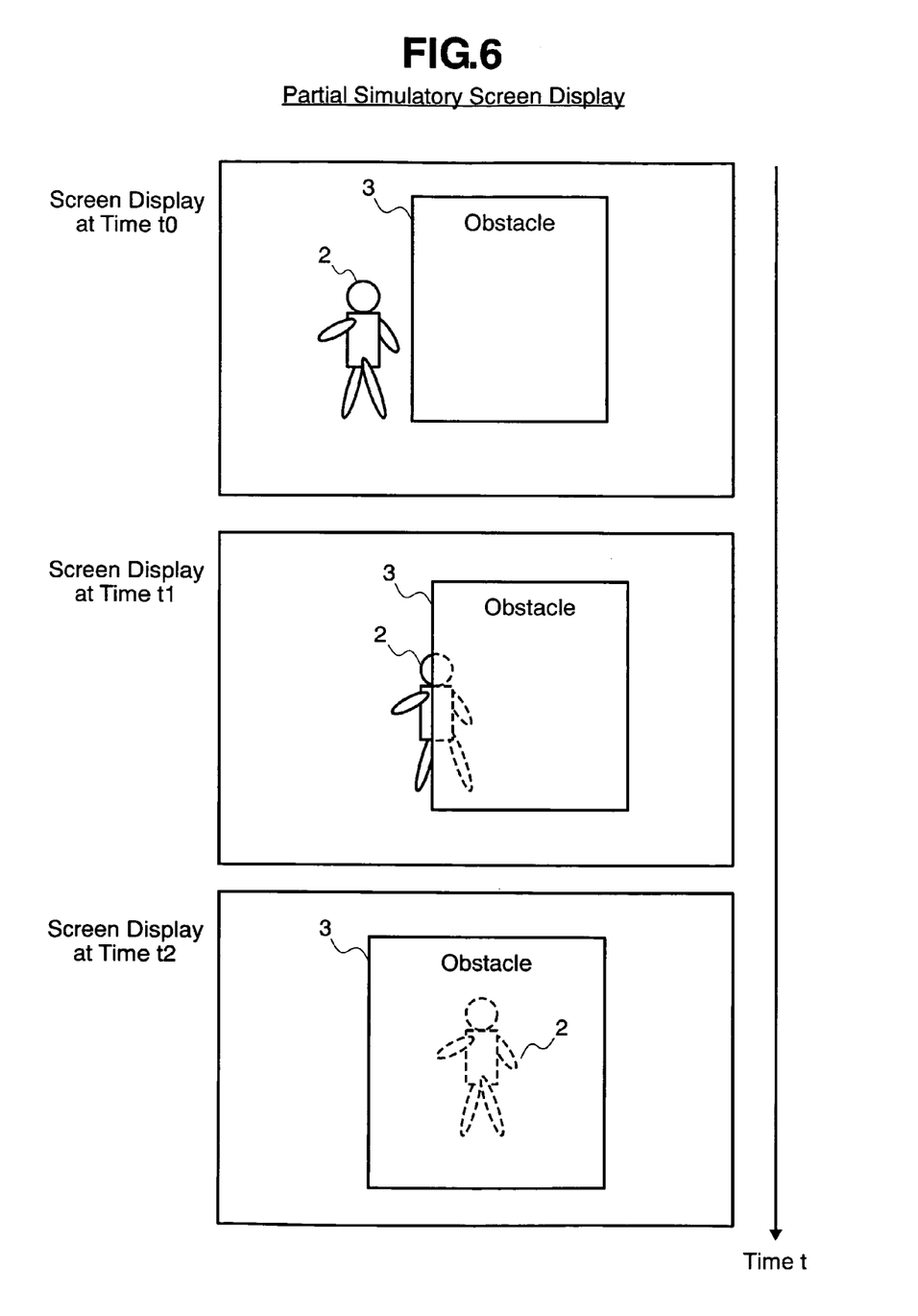
FIG. 6 shows a partial simulatory screen display.

A simulatory screen display of the mobile object 2 at time t0-t2 of the present invention is shown in FIG. 6. If a human being is recognized as a mobile object 2, the movement of the human being can be simulatedly displayed even when the human being is hidden by the obstacle 3 in the screen display at time t2, in addition to the manner of display in the fourth embodiment.

Sixth Embodiment

Figure 7:
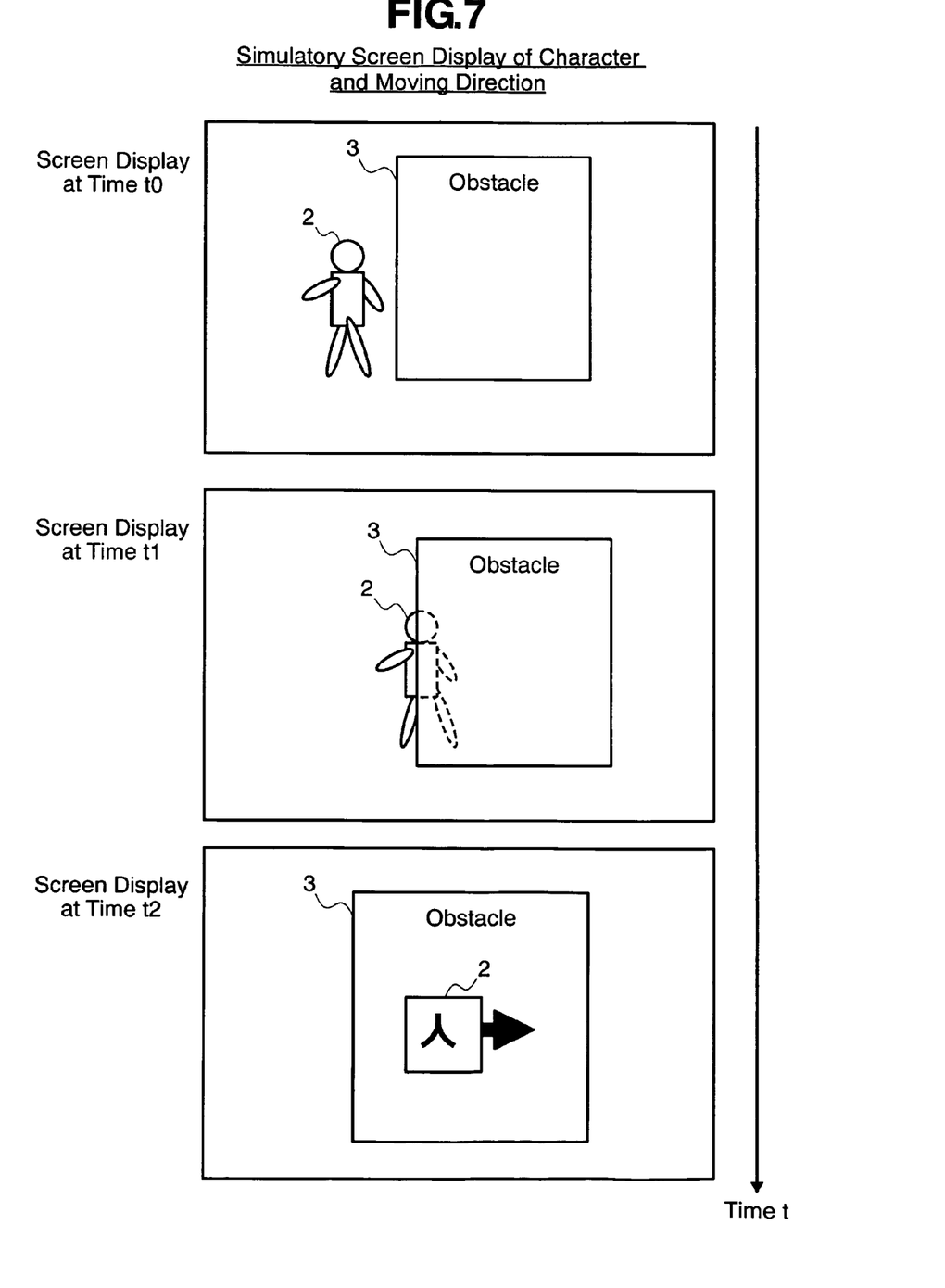
FIG. 7 shows a simulatory screen display of a character and a moving direction.

A simulatory screen display of the mobile object 2 at time t0-t2 of the present invention is shown in FIG. 7. When a human being is recognized as a mobile object 2, the human being in its hidden state behind an obstacle 3 is displayed, in the screen display at time t2, as represented by a character or encircled by a frame, in addition to the manner of display in the fifth embodiment. Further, the traveling direction is indicated by an arrow or the like such that the moving direction is intuitively known.

Seventh Embodiment

Figure 8:
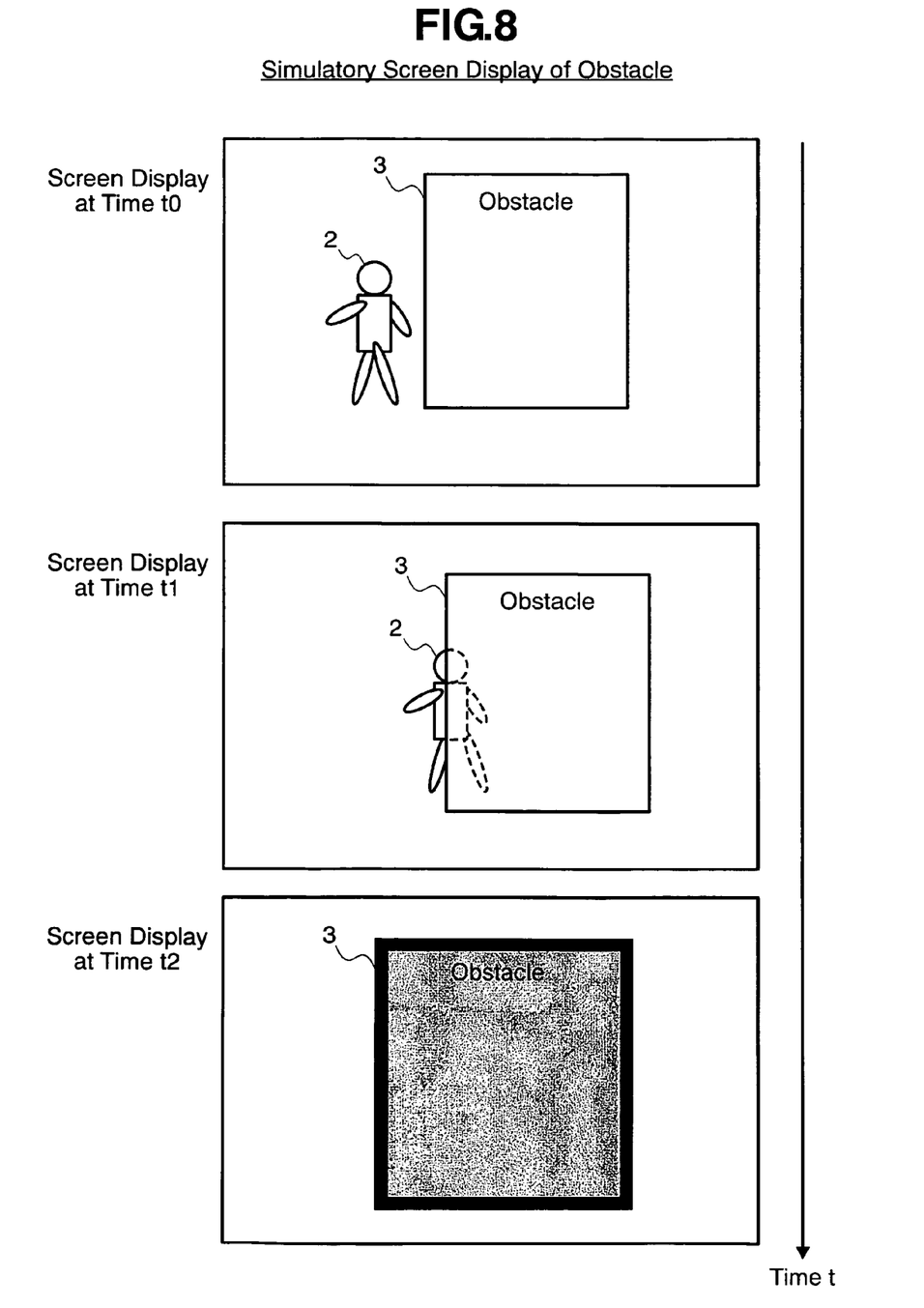
FIG. 8 shows a simulatory screen display of an obstacle.

A simulatory screen display of the mobile object 2 at time t0-t2 of the present invention is shown in FIG. 8. When a human being is recognized as a mobile object 2, in its state hidden behind an obstacle 3, the obstacle 3 itself is displayed, in the screen display at time t2, as encircled by a frame. The obstacle will be colored to indicate that a mobile object is hidden. Otherwise, the frame or the color will be displayed in a flashing manner. Still otherwise, the foregoing manners of display will be combined to indicate that the mobile object 2 is hidden behind the obstacle 3.

Eighth Embodiment

Figure 9:
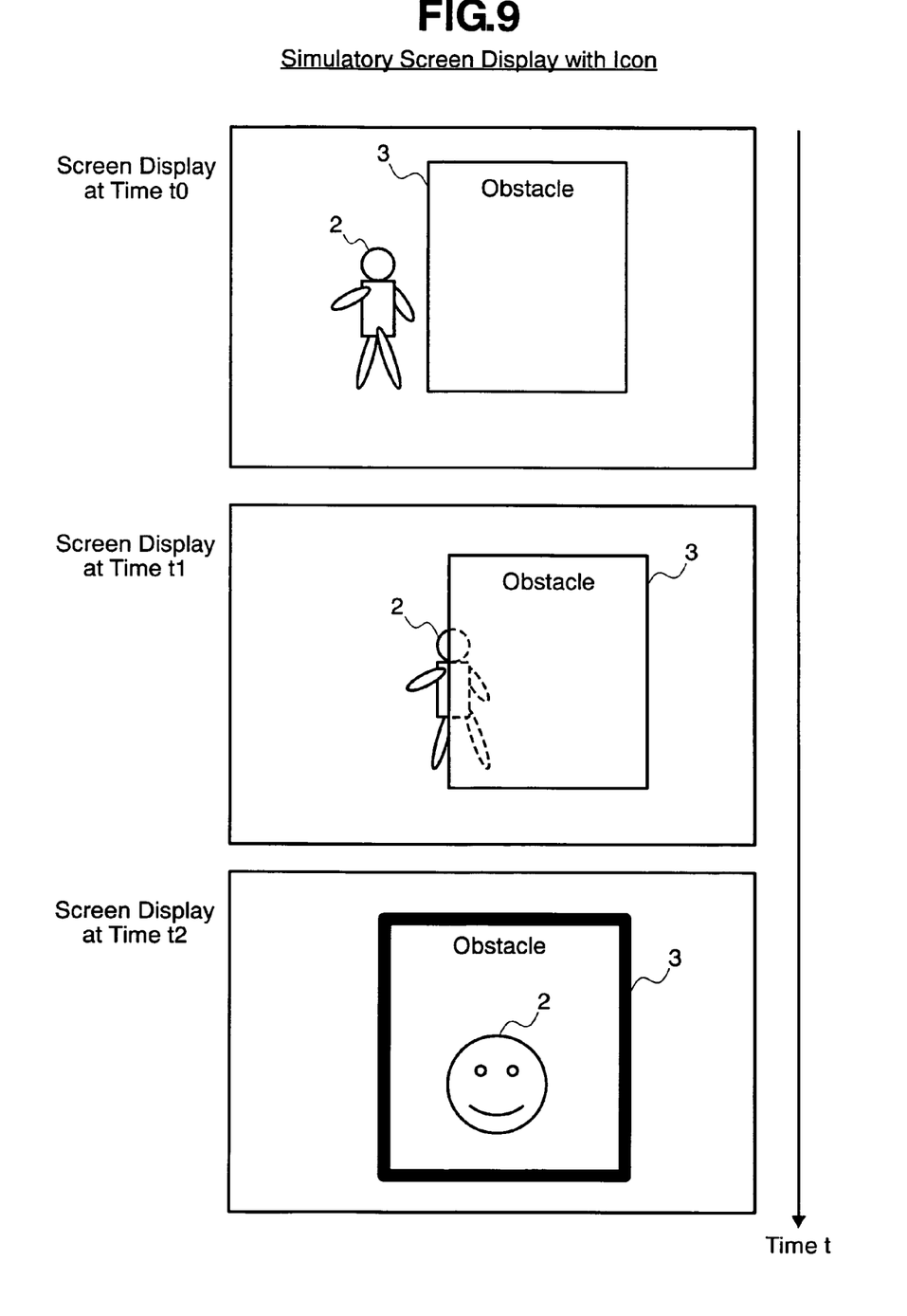
FIG. 9 shows a simulatory screen display with an icon.

A simulatory screen display of the mobile object 2 at time t0-t2 of the present invention is shown in FIG. 9. When a human being is recognized as a mobile object 2, and if then the feature extraction of the face of the human being can be made, the image of the face will be displayed as the mobile object 2. Otherwise, the human being hidden behind the obstacle 3 will be indicated by an iconized display.

Ninth Embodiment

Figure 10:
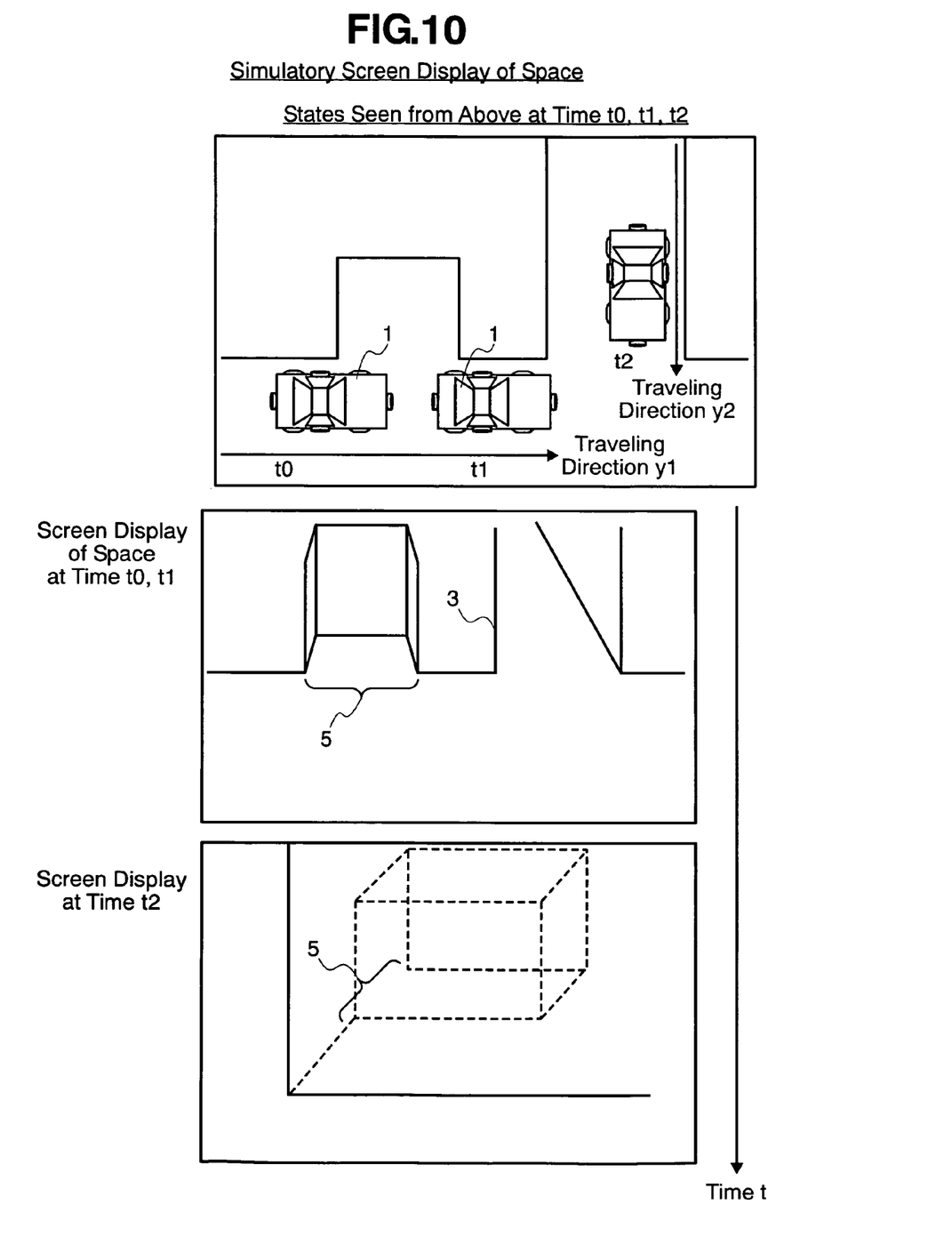
FIG. 10 shows a simulatory screen display of space.

A simulatory screen display of space is shown in FIG. 10. Picture information of a space is extracted from the picture information obtained by the vehicle at time t0, t1. On the basis of the extracted picture information of the space, though the space is by nature invisible hidden by the obstacle 3 at time t2, the simulatory screen display of the space can be made by the use of the picture data of the space derived from the earlier obtained picture information at time t0, t1.

In an exemplary embodiment of the present invention, when such an object as a human being or a vehicle has got behind an obstacle, a prediction as to when the object will burst out from behind the obstacle can be made by a calculation unit based on the optical flow of the mobile object derived from picture information obtained before the object has got behind the obstacle. And, a warning against the oncoming of the object can be given by a simulatory screen display of the mobile object, by a display with an icon or character, or by an audio warning from a sound unit giving a surround-sound in the approaching direction of the mobile object, or by such an audio warning as: "Mobile object in the left forward direction."

When a mobile object has burst out from behind an obstacle earlier than predicted, pattern matching between the picture image of this mobile object and the picture image of the mobile object stored in the storage module is made and, if they match with each other, the predicted picture image on the simulatory screen display will be switched over to an actual picture image. On the other hand, if the mobile object does not burst out from behind the obstacle even if the predicted time of bursting out has passed, the picture image taken before the object has hidden behind the object will be simulatedly displayed to indicate that the object is present behind the obstacle, or a display will be made with use of an animation, icon, or character representing the mobile object to indicate that the mobile object is behind the obstacle.

Further, in the case where the entire image of a mobile object cannot be taken due to existence of another vehicle as an obstacle, if it is possible for the camera to shoot the lower side of the other vehicle constituting the obstacle and if the picture of the mobile object can be taken by shooting the space between the lower side of the other vehicle and the road, then, pattern matching of the picture image thus taken with the picture image of the mobile object will be made to determine what the mobile object is. Thus, a simulated picture image of the mobile object will be displayed superimposed on the actual picture image of the other vehicle constituting the obstacle, and, thereby, existence of the mobile object, such as a human being, behind such an obstacle as the other vehicle will be displayed on the display unit. If a wheel of a bicycle or a bike is recognized, a display is made, on the basis of the size of the wheel of the bicycle or the wheelbase, to indicate that a bicycle or the like is hiding behind a vehicle, with animation, icon, or character. Further, in a case where another vehicle is existing beyond a high-roof vehicle, such as a station wagon or a four-wheel-drive vehicle, if only a portion of the vehicle behind the high-roof vehicle can be shot, the vehicle will be subjected to pattern matching with previously registered vehicle data, and a simulated picture image will be displayed to indicate the existence of the vehicle predicted to be beyond the high-roof vehicle with animation, icon, or character. Thus, the present apparatus makes it possible for a human being to intuitively recognize by sight what kind of object is present beyond an obstacle cutting out the view.

Further, the present apparatus simulatedly displays a space or an object, which is invisible by nature, on the basis of picture image data taken in the past, superimposed on an image of an obstacle, thereby enabling the state beyond the obstacle to be recognized.

According to the embodiments described in the foregoing, even under such a situation that a mobile object is not present in a human visual range or it cannot be shot with a camera because of existence of an obstacle, a simulatory screen display can be made by making use of the optical flow or image data taken in the past. Therefore, a collision of the host vehicle with the mobile object can be prevented from occurring. Thus, an advantage can be obtained that traffic accidents are prevented and the driver is supported in driving safely.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications that fall within the ambit of the appended claims.

What is claimed is:

1. A driving support apparatus comprising:
    an image taking module to take an image of an object of shooting;
    a display module to display the image taken by said image taking module; and
    a controlling module to calculate an optical flow of a mobile object when the mobile object is included in the object of shooting and, when the mobile object is hidden by another object and cannot be shot, to calculate a position of the mobile object based on an optical flow of the mobile object calculated before its being hidden and to control said display module to display the mobile object superimposed on the other object; and
    a notifying module to notify a driver of a potential for collision with a mobile object,
    wherein said controlling module detects the optical flow of said driving support apparatus and, when it is predicted that said driving support apparatus collides with the mobile object on the basis of the optical flow of the mobile object and the optical flow of said driving support apparatus, notifies the driver that said apparatus will collide with the mobile object through said notifying module.

2. The driving support apparatus according to claim 1, wherein:
    said apparatus has a plurality of said image taking modules, and
    said controlling module calculates the optical flow by performing stereophonic processing of a signal output from said plurality of image taking modules.

* * * * *

UNITED STATES PATENT AND TRADEMARK OFFICE
CERTIFICATE OF CORRECTION

PATENT NO.       : 7,602,945 B2                                   Page 1 of 1
APPLICATION NO.  : 11/474394
DATED            : October 13, 2009
INVENTOR(S)      : Kubo et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 779 days.

Signed and Sealed this

Fifth Day of October, 2010

David J. Kappos
*Director of the United States Patent and Trademark Office*